United States Patent
Kitaori et al.

[11] Patent Number: 5,766,781
[45] Date of Patent: Jun. 16, 1998

[54] MAGNETIC RECORDING MEDIUM

[75] Inventors: Noriyuki Kitaori; Osamu Yoshida; Katsumi Sasaki; Junko Ishikawa, all of Tochigi, Japan

[73] Assignee: Kao Corporation, Tokyo, Japan

[21] Appl. No.: 591,322

[22] Filed: Jan. 25, 1996

[30] Foreign Application Priority Data

Jan. 25, 1995 [JP] Japan ................... 7-009447

[51] Int. Cl.$^6$ ............................... G11B 5/66
[52] U.S. Cl. ............... 428/694 T; 428/694 TR; 428/900
[58] Field of Search .............. 428/694 T, 694 TR, 428/900

[56] References Cited

U.S. PATENT DOCUMENTS

| | | | |
|---|---|---|---|
| 4,371,590 | 2/1983 | Izumi et al. | 428/555 |
| 4,387,136 | 6/1983 | Saito et al. | 428/328 |
| 4,477,489 | 10/1984 | Yanai et al. | 427/132 |
| 4,521,481 | 6/1985 | Nagao et al. | 428/336 |
| 5,525,398 | 6/1996 | Takai et al. | 428/141 |

FOREIGN PATENT DOCUMENTS 4113508  4/1992  Japan.

*Primary Examiner*—Leszek Kiliman
*Attorney, Agent, or Firm*—Oblon, Spivak, McClelland, Maier & Neustadt, P.C.

[57] ABSTRACT

A magnetic recording medium is disclosed which comprises a support having thereon a thin magnetic metal film comprising columns of magnetic metal grains grown obliquely, wherein each of said columns is bent having a curvature rate of 10% or more.

3 Claims, 2 Drawing Sheets

5,766,781

1

MAGNETIC RECORDING MEDIUM

FIELD OF THE INVENTION

The present invention relates to a magnetic recording medium suitable for longitudinal recording.

BACKGROUND OF THE INVENTION

A thin metal film type magnetic recording medium comprising a magnetic layer is known to be formed by an oblique vacuum deposition method.

The formation of a thin metal film in a vacuum can be possibly accomplished by PVD (physical vapor deposition) or CVD (chemical vapor deposition). However, a thin magnetic film metal film having a high coercive force is not obtained simply by the use of PVD or CVD. Among magnetic thin films formed by these methods, one formed by oblique vacuum deposition method exhibits a relatively high coercive force due to the orientation of grains therein but it is still insufficient for practical purposes.

In order to eliminate the foregoing disadvantages, an approach has been proposed which comprises obliquely vacuum-depositing magnetic metal grains with oxygen gas being supplied. In other words, the proposed method involves oxidation and separation of magnetic metal grains so that obliquely-oriented columnar magnetic metal grains are magnetically separated to reduce the ratio of occupation of magnetic grains per unit volume, thereby enhancing the coercive force of the thin metal film.

The group of columnar grains which have thus been separated and oriented and then have obliquely grown is called a "column".

It as been found that even when magnetic films are formed from the same magnetic metal, they have different electromagnetic conversion characteristics depending on their column structures.

The inventors investigating the column structure of the magnetic films have found that the magnetic films exhibit different electromagnetic conversion characteristics depending on column curvatures. More specifically, it was found that a magnetic film having a greater column curvature can be used advantageously in high frequency recording (reproduction) using a ring-type magnetic head.

SUMMARY OF THE INVENTION

It is therefore an object of the present invention to provide a magnetic recording medium having excellent electromagnetic conversion characteristics.

The foregoing object of the present invention is accomplished with a magnetic recording medium comprising a support having thereon a thin magnetic metal film comprising columns of magnetic metal grains grown obliquely, wherein each of the columns is bent having a curvature rate of 10% or more.

BRIEF DESCRIPTION OF THE DRAWINGS

By way of example and to make the description more clear, reference is made to the accompanying drawings in which.

2

Figure 3:
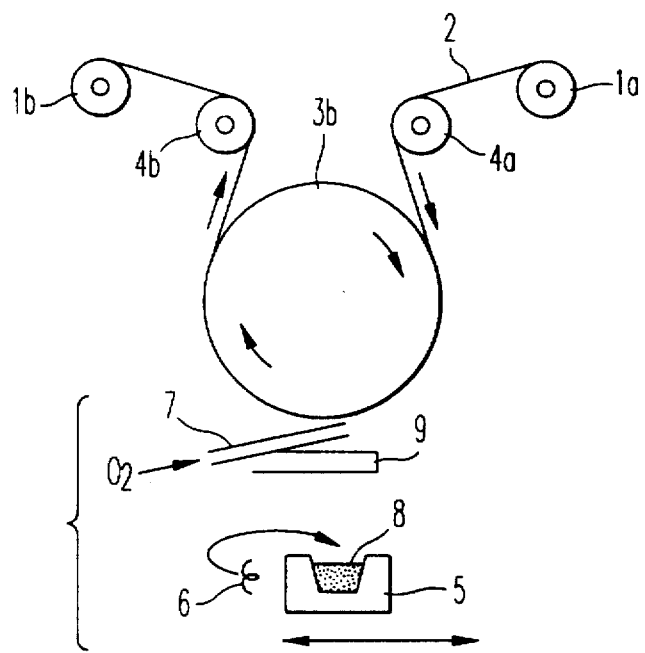

FIG. 3 is a schematic view illustrating another embodiment of an oblique vacuum deposition apparatus for preparing the magnetic recording medium according to the present invention.

DETAILED DESCRIPTION OF THE INVENTION

The upper limit of the curvature rate of the column preferably is 40% or less, more preferably 35% or less, particularly 25% or less. The lower limit of the curvature rate of the column is 10%, preferably 15%.

The obliquity angle of the column is preferably from 35° to 55°, more preferably from 40° or more to 50° or less.

Figure 1:
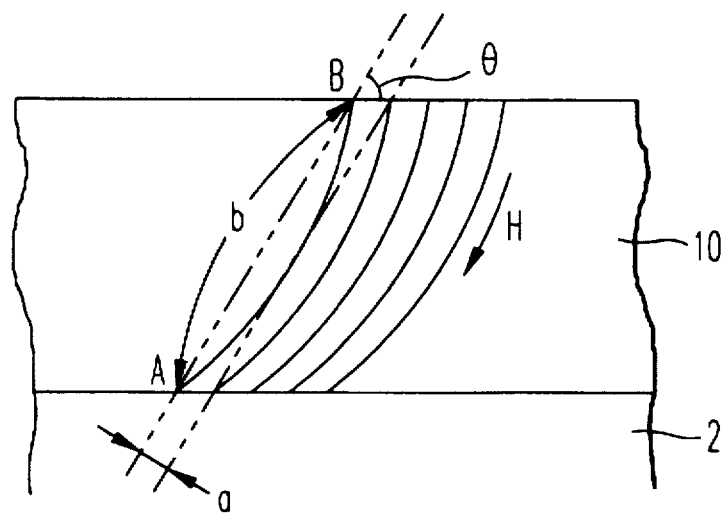
FIG. 1 is a schematic view of a magnetic recording medium according to the present invention.

The curvature rate and obliquity angle of the column as used herein are determined as follows. A magnetic film formed by oblique vacuum method is schematically shown in FIG. 1. Supposing that the column structure of a magnetic film 10 provided on a support 2 is formed as shown in FIG. 1, the curvature rate (%) is represented by (a/b)×100 wherein a is the maximum length of the line perpendicular to the chord of the column structure and b is the length AB (chord) of the column structure. The obliquity angle of the column is the angle between the straight line AB (chord of the column structure) and the support (horizontal direction).

The thickness of the magnetic film is preferably from 1,000 to 5,000 Å, more preferably from 1,000 to 4,000 Å, particularly from 1,000 to 1,800 Å.

The reason why a magnetic film which has been obliquely grown with a greater curvature can be used advantageously for a ring-type magnetic head is considered as follows:

In FIG. 1, the line of magnetic force from the ring magnetic head runs in the direction of arrow H. In this system, the head is a ring-type one and the tape and the head move at a high speed relatively to each other. Thus, the column structure being matched along the line of magnetic force from the magnetic head is advantageous for easier magnetization. Accordingly, the present invention can provide a higher output and a better overwritability (erasion rate). Thus, the optimum curvature of the column was found to be 10% or more, preferably 15% or more, more preferably 20%. Further, the optimum obliquity angle of the column was found to be from 35° to 55°, preferably from 40° to 50°.

The support to be used for the magnetic recording medium of the present invention may be either magnetic or non-magnetic, normally non-magnetic. Examples of such useful support material include organic materials such as polyester (e.g., PET), polyamide, polyimide, polysulfone, polycarbonate, olefin resins (e.g., polypropylene), cellulose resin and vinyl chloride resin, ceramics such as glass, and metallic materials such as aluminum alloy. The support may optionally have an undercoat layer provided on its surface for enhancing its adhesivity to the magnetic layer (thin magnetic film).

A thin magnetic film is then formed on one side of the support by, e.g., oblique vacuum deposition method. Examples of the material of magnetic grains constituting the thin magnetic film include metals such as Fe, Co and Ni, Co—Ni alloy, Co—Pt alloy, Co—Ni—Pt alloy, Fe—Co alloy, Fe—Ni alloy, Fe—Co—Ni alloy, Fe—Co—B alloy, Co—Ni—Fe—B alloy, Co—Cr alloy, and those obtained by incorporation a metal such as Al into these materials. Alternatively, nitride, carbide and oxide of ferromagnetic metals such as Fe—N, Fe—N—O, Fe—C, Fe—C—O and Fe—N—C—O, and composite thereof may be used. The thickness of the magnetic layer is preferably smaller than the ordinary value. For example, it is from 1,000 to 4,000 Å, particularly from 1,000 to 1,600 Å.

The formation of a thin magnetic metal film is preferably carried out with the supply of an oxidizing gas so as to form a protective layer made of an oxide film on the surface thereof. A further protective layer made of diamond-like carbon, carbon nitride, silicon oxide, boron carbide, silicon nitride, etc. may preferably be formed. A layer made of fluorinic or carbon lubricant may preferably be formed on the protective layer as a lubricant layer.

Figure 2:
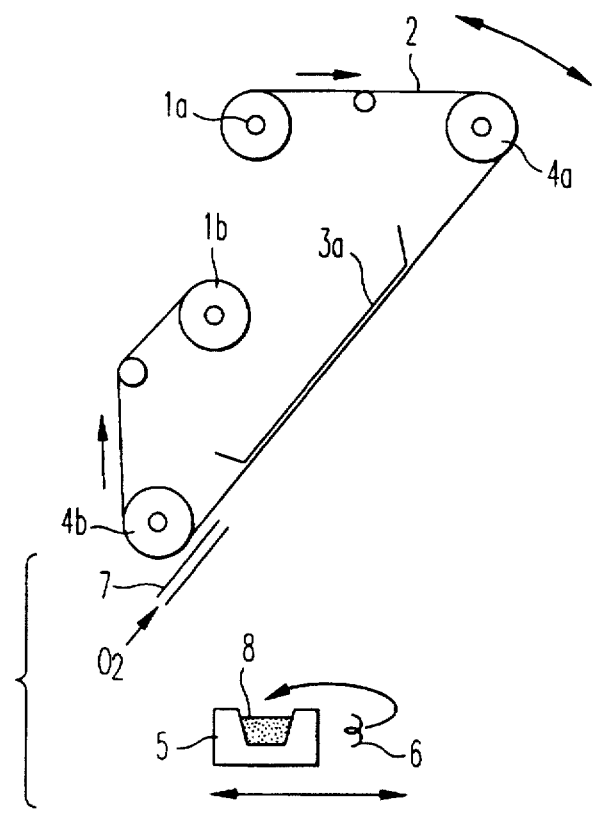
FIG. 2 is a schematic view illustrating an embodiment of an oblique vacuum deposition apparatus for preparing the magnetic recording medium according to the present invention.

As an apparatus for obliquely vacuum-depositing a thin magnetic metal film there may be employed an oblique vacuum deposition apparatus shown in FIG. 2. Further, a cylindrical can roll may be used as a guide for cooling the support as shown in FIG. 3.

Shown at the reference numerals 1a and 1b in FIGS. 2 and 3 are a roll for feeding the support 2 and a roll for winding the support 2, respectively. Shown at the reference numerals 3a and 3b are cooling guides. Shown at the reference numerals 4a and 4b are guide rollers provided on the running passage of the support 2. Shown at the reference numerals 5, 6, 7 and 8 are a crucible, an electron gun, an oxidizing (oxygen) gas supply nozzle and a magnetic metal, respectively. In operation, the support 2 is carried from the feed roll 1a to the winding roll 1b while the magnetic metal grains are evaporated from the crucible 5. In this arrangement, the magnetic metal grains are accumulated on the support 2 being guided by the cooling guide 3a or 3b. In the case of the embodiment shown in FIG. 3, a screen 9 may be provided above the crucible 5 for controlling the accumulation of the magnetic metal grains. The magnetic film thus obtained is then examined for column structure. If the results of the examination meet the requirements of the present invention, the formation of the magnetic film may be continued under the same conditions. If the results of the examination deviate from the requirements of the present invention, the guide roller 4a or crucible 5 may be repositioned to determine proper conditions meeting the requirements for column structure of the magnetic film according to the present invention. Then, the formation of the magnetic film may be resumed under the conditions thus determined.

The present invention will be further described in the following examples, but the present invention should not be construed as being limited thereto.

EXAMPLE 1

The apparatus of FIG. 2 was used to prepare a thin metal film type magnetic tape shown in FIG. 1.

As a magnetic metal there was used Co (100% purity). The magnetic film thus formed was a single layer. The thickness of the magnetic film was 1,500 Å.

The curvature rate ((a/b)×100) of the column of the magnetic film thus obtained was 20% and the obliquity angle θ of the column was 45°.

The magnetic tape exhibited a vertical coercive force of 2,340 Oe, a longitudinal coercive force of 1,620 Oe and a saturated magnetic flux density of 5,400 G.

EXAMPLE 2

The following magnetic tape was prepared in accordance with the procedure of Example 1.

| Magnetic material: | Co (100% purity) |
| --- | --- |
| Thickness of magnetic film (single layer): | 1,500 Å |
| Curvature rate of column: | 30% |
| Obliquity angle θ of column: | 35° |
| Vertical coercive force: | 2,420 Oe |
| Longitudinal coercive force: | 1,480 Oe |
| Saturated magnetic flux density: | 5,600 G |

EXAMPLE 3

The following magnetic tape was prepared in accordance with the procedure of Example 1.

| Magnetic material: | Co (100% purity) |
| --- | --- |
| Thickness of magnetic film (single layer): | 1,500 Å |
| Curvature rate of column: | 15% |
| Obliquity angle θ of column: | 40° |
| Vertical coercive force: | 2,550 Oe |
| Longitudinal coercive force: | 1,700 Oe |
| Saturated magnetic flux density: | 5,500 G |

EXAMPLE 4

The following magnetic tape was prepared in accordance with the procedure of Example 1.

| Magnetic material: | Co (100% purity) |
| --- | --- |
| Thickness of magnetic film (single layer): | 1,500 Å |
| Curvature rate of column: | 35% |
| Obliquity angle θ of column: | 55° |
| Vertical coercive force: | 2,810 Oe |
| Longitudinal coercive force: | 1,720 Oe |
| Saturated magnetic flux density: | 5,400 G |

COMPARATIVE EXAMPLE 1

The following magnetic tape was prepared in accordance with the procedure of Example 1.

| Magnetic material: | Co (100% purity) |
| --- | --- |
| Thickness of magnetic film (single layer): | 1150 Å |
| Curvature rate of column: | 5% |
| Obliquity angle θ of column: | 30° |
| Vertical coercive force: | 2,100 Oe |
| Longitudinal coercive force: | 1,600 Oe |
| Saturated magnetic flux density: | 5,400 G |

COMPARATIVE EXAMPLE 2

The following magnetic tape was prepared in accordance with the procedure of Example 1.

| Magnetic material: | Co (100% purity) |
|---|---|
| Thickness of magnetic film (single layer): | 1,500 Å |
| Curvature rate of column: | 7% |
| Obliquity angle θ of column: | 25° |
| Vertical coercive force: | 2,210 Oe |
| Longitudinal coercive force: | 1,620 Oe |
| Saturated magnetic flux density: | 5,500 G |

COMPARATIVE EXAMPLE 3

The following magnetic tape was prepared in accordance with the procedure of Example 1.

| Magnetic material: | Co (100% purity) |
|---|---|
| Thickness of magnetic film (single layer): | 1,600 Å |
| Curvature rate of column: | 5% |
| Obliquity angle θ of column: | 40° |
| Vertical coercive force: | 2,220 Oe |
| Longitudinal coercive force: | 1,580 Oe |
| Saturated magnetic flux density: | 5,450 G |

Characteristics:

Using a modified version of ED-βVCR available from Sony Corp., 1 MHz, 5 MHz, 10 MHz, 20 MHz and 30 MHz signals were recorded on the foregoing magnetic tapes. Using the same machine, these signals were reproduced. The reproduced output and overwritability (erasion rate at 20 MHz) were then determined. The results are set forth in Table 1.

For the evaluation of reproduced output, a sinusoidal wave signal was recorded on the magnetic tape at each of the frequencies. The reproduced output was then measured by means of a spectral analyzer.

For the evaluation of overwritability, a 10 MHz sinusoidal wave signal was recorded on the magnetic tape. The reproduced signal output was then measured. Subsequently, a 20 MHz signal was then recorded on the same magnetic tape. The remaining 10 MHz signal output was measured and then compared with the initial reproduced signal output.

TABLE 1

| Example No. | Output | | | | | Erasion Rate |
|---|---|---|---|---|---|---|
|  | 1 MHz | 5MHz | 10 MHz | 20 MHz | 30 MHz |  |
| Example 1 | 0 | 0 | +0.5 | +1.1 | +1.3 | −6.4 |
| Example 2 | 0 | 0 | +0.1 | +1.4 | +2.4 | −6.6 |
| Example 3 | 0 | 0 | +0.3 | +1.0 | +2.1 | −4.8 |
| Example 4 | 0 | 0 | +0.4 | +1.4 | +2.9 | −5.4 |
| Comparative Example 1 | 0 | 0 | 0 | 0 | 0 | 0 |
| Comparative Example 2 | 0 | 0 | +0.1 | +0.2 | +0.6 | −0.8 |
| Comparative Example 3 | 0 | 0 | +0.2 | +0.4 | +0.7 | 0 |

(Note 1) The output is represented relative to that of Comparative Example 1 as 0dB.
(Note 2) The erasion is represented relative to that of Comparative Example 1 as 0dB. A greater minus value means a better erasion.

As can be seen from the above results, the magnetic tapes of the present invention are suitable for high density recording and give a high reproduced output and exhibit good overwritability. The magnetic recording medium of the present invention thus is suitable for high density recording, giving a high reproduced output and exhibiting a good overwritability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon a thin magnetic metal film comprising columns of magnetic metal grains grown obliquely, wherein each of said columns is bent having a curvature rate of 10% or more, and each of said columns has a obliquity angle of from 35° to 55°.

2. The magnetic recording medium of claim 1, wherein the upper limit of said curvature rate is 40% or less.

3. The magnetic recording medium of claim 1, wherein said curvature rate is 15 to 35%.

* * * * *